United States Patent
Tobias et al.

(10) Patent No.: US 6,524,425 B1
(45) Date of Patent: Feb. 25, 2003

(54) METHOD FOR BUTT WELDING CROSS-LINKED POLYETHYLENE PIPES (PE-X PIPES)

(75) Inventors: Wolfgang Tobias, Halle (DE); Gunter Bernstein, Grüna (DE)

(73) Assignee: Kunststoff-Zentrum In Leipzig GmbH, Leipzig (DE)

( * ) Notice: Subject to any disclaimer, the term of this patent is extended or adjusted under 35 U.S.C. 154(b) by 0 days.

(21) Appl. No.: 09/857,897

(22) PCT Filed: Dec. 4, 1999

(86) PCT No.: PCT/DE99/03940
§ 371 (c)(1),
(2), (4) Date: Jun. 11, 2001

(87) PCT Pub. No.: WO00/34028
PCT Pub. Date: Jun. 15, 2000

(30) Foreign Application Priority Data

Dec. 9, 1998 (DE) .................................... 198 56 718

(51) Int. Cl.[7] .............................................. B29C 65/18
(52) U.S. Cl. ................ 156/304.6; 156/304.1; 156/308.4; 156/309.6; 156/304.5
(58) Field of Search ................... 156/304.1, 304.5, 156/304.6, 502, 507, 308.4, 309.6

(56) References Cited

U.S. PATENT DOCUMENTS 3,927,233 A * 12/1975 Naidoff ..................... 138/178
3,972,548 A * 8/1976 Roseen ...................... 156/158

FOREIGN PATENT DOCUMENTS

DE          139544      * 1/1980
GB         2246318     * 1/1992

* cited by examiner

*Primary Examiner*—Mark A. Osele
(74) *Attorney, Agent, or Firm*—Laurence A. Greenberg; Werner H. Stemer; Ralph E. Locher

(57) ABSTRACT

The invention relates to a method for butt welding cross-linked polyethylene pipes in order to use these pipes in industrial and underground pipeline construction. The pipe faces are spatially melted on using a serrated heating element at a temperature >420° C. but <450° C. with a warming up time of greater than sixty seconds such that enlarged and serrated pipe faces are produced whose integral melt layers join during the joining process while under a welding pressure of 0.1 to 0.4 N/mm$^2$.

3 Claims, 2 Drawing Sheets

METHOD FOR BUTT WELDING CROSS-LINKED POLYETHYLENE PIPES (PE-X PIPES)

BACKGROUND OF THE INVENTION

Field of the Invention

The invention relates to a method for the butt welding of crosslinked polyethylene pipes (PE-X pipes) in order to utilize these pipes in industrial and underground pipeline construction.

High-density polyethylene pipes (HD-PE pipes) are distinguished by outstanding properties. In particular in pipeline construction for gas and water, they are assuming a dominant position. They are flexible, elastic, corrosion-resistant, electrically insulating and can be welded unproblematically. However, owing to their susceptibility to notching and abrasion, they must be laid an ground which is free from stones, possibly requiring a sand fill. It is not uncommon for this sand fill to cost more than the pipe. Therefore, trenchless laying and re-lining by drawing the pipes into existing worn-out pipelines is hot economically possible. These requirements and restrictions ultimately determine the costs of the pipeline construction.

Crosslinked polyethylene pipes (PE-X pipes) even surpass the properties of high-density polyethylene pipes (HD-PE pipes), since their temperature resistance goes up to +100° C., they are resistant to abrasive solids and media, they have good long-term resistance, a low friction coefficient and do not tend toward stress cracking or either slow or fast crack propagation. These positive properties, in particular the relatively high wear resistance and the good long-term resistance of -he PE-X pipes, could be cost-effectively utilized in the public sector for gas, water, sewage and cable pipes. The notch resistance of PE-X pipes means that no laborious and cost intensive sand fill is required any longer and also allows trenchless pipe laying with corresponding deep plowing. Furthermore, it also permits the re-lining of steel drinking water and sewage lines, which are drawn into the flexible and scratch-resistant PE-X pipe. This leads to considerable savings by simplifying the laying technique and to a possible reduction in the pipe wall thickness on account of the greater strength of the PE-X pipes.

However, in the production of pipeline systems, the joining technique constitutes a major problem. Just as the previously mentioned properties of PE-X pipes are advantageous, so the lack of weldability is disadvantageous. The crosslinkage causes the thermoplastic character of the polyethylene starting material to be lost. This means that, among the findings according to the general consensus, crosslinked polyethylene (PE-X) does not enter into an integral bond with itself.

Traditional welding methods lead only to very inadequate weld-seam strengths. Welding methods which are distinguished by high cost-effectiveness in tradicional PE pipeline construction are heating-element welding for pipe diameters >110 mm and electric socket fusion welding (in industrial pipeline construction also heating-element socket fusion welding) mostly for smaller pipe diameters.

Apart from electric socket fusion welding, these welding methods cannot be used for crosslinked PE pipes, since, on account of its molecular structure, crosslinked polyethylene (PE-X) represents a thermoelastic and, under the effect of heat in the welding temperature range for HD-PE, no longer melts but just becomes elastomeric.

Since the mid-1970s, crosslinked polyethylene pipes (PE-X pipes) of up to 63 mm, have been used in the sanitary sector and in age hot-water and heating sector and also for gas pressure lines and compressed-air lines. In the case of these lines, the usually long pipes are connected to one another by means of mechanical connectors of brass or high-grade steel (specialist periodical gwf-Gas-Erdgas, year 131, 1990, issue 10/11, pages 477–482).

The disadvantage of these solutions is the high cost and installation effort, which increases with increasing pipe diameter. In addition, the connectors upset the material-related range of properties of crosslinked polyethylene. The great interest of all pipeline constructors, in particular of the gas and water industries, in utilizing the outstanding. properties of PE-X pipes led to investigations into connection possibilities and the reliability of these connections.

The general consensus was to assume that PE-X cannot be welded. Investigations undertaken by institutes and pipeline construction companies in Germany and elsewhere showed, however, that it is possible to weld crosslinked polyethylene with uncrosslinked polyethylene. It was also established that PE-X cannot be welded with PE-X.

Heating-element welded connections between PE-X and HD-PE pipelines achieved a welding factor of >0.5 ("Einsatz des Rohrwerkstoffes PE-X in der Gasversorgung" [use of the pipe material PE-X for gas supply], Mitglieder-information [information for members] November 1987 of the Kunststoffrohrverbandes e.V. [German plastic pipe association], Bonn). However, a PE-X pipe/HD-PE pipe connection is of no commercial significance. Furthermore, the use of electric welding sockets made of HD-PE for connecting PE-X pipes was successfully tested. In the welding process, the HD-PE is melted, the PE-X just becomes elastomeric. Strength determinations showed that this connection is suitable for the gas and water supply sector. Some pipelines are in operation ("Der Rohrleitungswerkstoff PE-X; Rohrwerkstoffeigenschaften, Qualitätssicherung und Haupteinsatzgebiete" [the pipeline material PE-X; pipe material properties, quality assurance and main areas of use], of the conference proceedings and address before the 1998 international plastic pipe conference in Wiesbaden on Apr. 27 and 28, 1998 and "Entscheidungskriterien bei der Auswahl von Rohrwerkstoffen in der Gasversorgung" [decision-making criteria in the selection of pipe materials for gas supply], likewise from the cited conference proceedings).

This method of connection with electric welding fittings is cost-intensive as the pipe diameter becomes greater and is not suitable for the re-lining of pipe systems, since the electrical welding sockets get in the way when the PE-X pipe is drawn in.

In the patent literature, DD-WP 139 544, disclosed a method of connecting crosslinked semifinished products, in particular pipes of crosslinked Polyethylene. According to this, the joining faces of the pipe ends to be welded are heated with a flat-formed heating element to at least 450° C., with a warming-up time of 8 seconds, and, after removal of the heating element, are joined together under high pressure, the pressure being maintained until the joining zone has cooled to ambient temperature. This method has not been adopted for practical pipeline construction, since no reproducible or satisfactory weld-seam strengths were achieved.

Furthermore, GB-A-2 246 318 discloses a butt-welding method for connecting pipes, fittings, branches and the like of medium—or high-density polyethylene, in which the pipe ends to be connected are heated to welding temperature in a welding device with a plate-shaped heating element, then joined together and left in the welding device until the joining zone has cooled. In the butt welding of pipes of relatively large diameter, a long time is required for the pipe ends to warm up to the welding temperature. This long warming-up time is to be shortened and consequently a time saving in the overall welding process is to be achieved. For this purpose, the butt-welding device is equipped with a heating element (heating plate), which has grooves or a contour profile on both sides, so that the heat transfer from the heating element to the pipe ends is improved by the enlargement of the heating element surface achieved in this way. The profilings may be configured in many ways and have the form of concentric rings or a pyramid structure (waffle iron pattern) or are formed as radial grooves/radial serration. The suitable profile depth is in the range from 1–10 mm.

SUMMARY OF THE INVENTION

The object of the invention is to provide a method for the butt welding of crosslinked polyethylene pipes, preferably for diameters >90 mm, which is distinguished by a connection forming an integral joint, high strength of the weld seam, cost-effectiveness and practical suitability.

The invention is based on the heating-element butt welding method known per se for pipes with a pipe diameter >90 mm. According co the invention, the pipe end faces of the crosslinked polyethylene pipes (PE-X pipes) are spatially melted by a radially serrated heating element, the temperature of which is >420° C. but <450° C., with a warming-up time >60 s, dependent on the pipe wall thickness, in such a way that the local thermal disintegration of the crosslinked material structure has the effect of producing enlarged and serrated pipe end faces, the integral melt layers of which, which contain all possible phases of the melting state from the vapor or gas phase to the thermoelastic phase, come into connection with one another during the subsequent joining process under a welding pressure of 0.10 to 0.40 N/mm² in such a way that the tips of the teeth of the one pipe end face meet the bases of the teeth of the other pipe end face, that a melt phase of these layers which is capable of entering into a connection evokes a mixing effect of the melt by means of turbulent movements at the contacting tooth flanks and a spatially distributed weld seam is produced with an enlarged binding surface. The welding pressure is maintained until the joining zone has cooled to ambient temperature.

The radial serration of the plate-shaped heating element proceeds from the periphery of the heating element in a converging manner to the center point, each radial tooth rib forming an equilateral triangle with a flank angle of 60°. In the warming-up process, the center point of the radial serration and the pipe axes must lie in one axis.

The advantages achieved by the invention are, in particular, that, with the butt welding method presented, crosslinked polyethylene pipes (PE-X pipes) can be connected to one another directly in a permanent and durable manner and without welding auxiliary means or an additional material.

The solution according to the invention makes the low-cost use of crosslinked PE pipes of relatively large diameter possible in the first place. The results can be utilized in all industrial and underground pipe construction.

An exemplary embodiment of the invention is represented in the drawing and is described in more detail below.

A butt-welded connection between two pipes of crosslinked polyethylene of the dimension 110×10 mm is produced.

DESCRIPTION OF THE PREFERRED EMBODIMENTS

Figure 1:
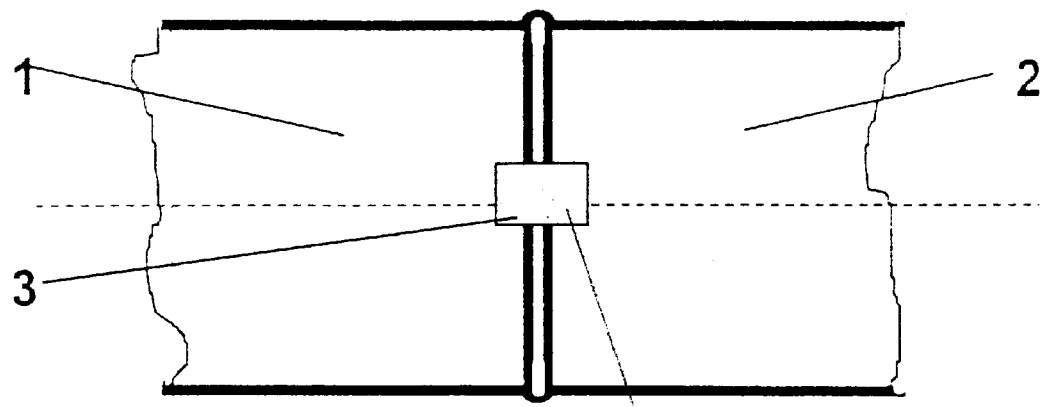
FIG. 1 shows a butt-welded connection between the pipes 1 and 2 with the indicated detail 3
Figure 2:
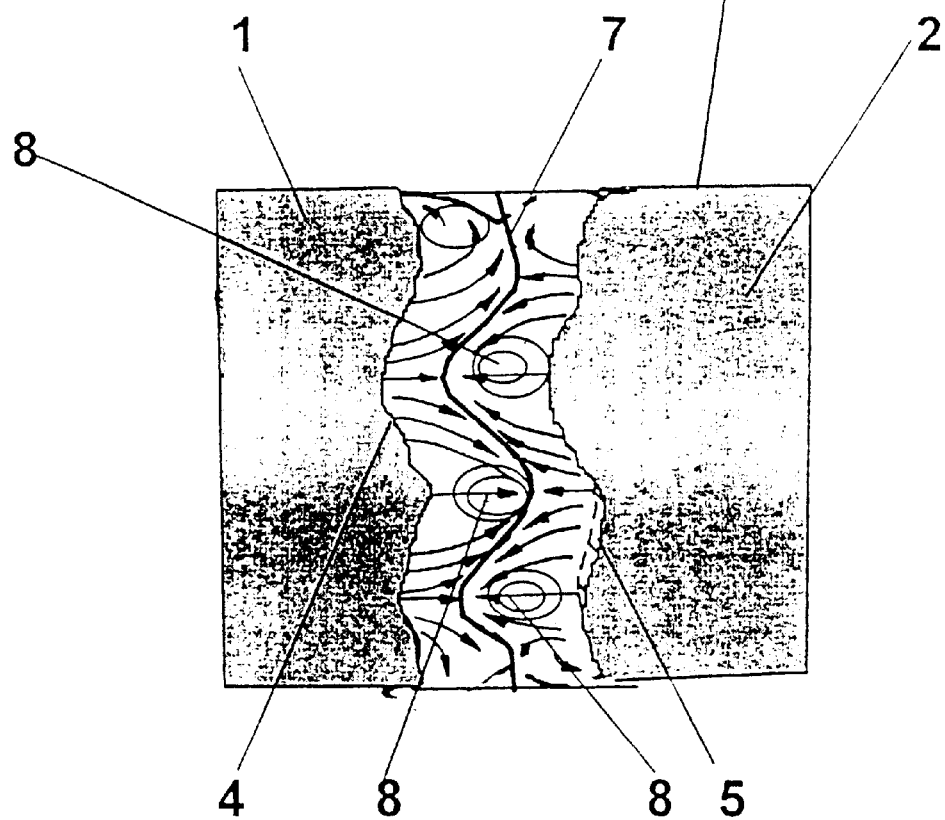
FIG. 2 shows an enlarged detail 3 according to FIG. 1 with a view of the weld seam

According to FIG. 1, the PE-X pipes 1 and 2 are connected to each other by heating-element butt welding. For this purpose, the pipe end faces 4 and 5 of the PE-X pipes 1 and 2 are melted by the radially serrated heating element 6, the temperature of which is 435° C., with a warming-time of 180 s, in such a way that an enlarged and serrated surface with an integrated melt layer is produced on both pipe end faces 4 and 5, FIG. 2.

In the joining process immediately following the removal of the heating element 6, with a welding pressure 0.2 N/mm², a counter-flowing of the melt takes place in the contact region of the binding surface 7, leading to turbulent mixings 8 and also to an additional mechanical mixing effect and to an enlargement of the binding surface.

The welding pressure of 0.2 N/mm² is maintained until the coining zone has cooled to ambient temperature. After cooling, the butt welding has been completed and an integral connection is established between the PE-X pipes. The welding factors achieved are 1, the conditions of the long-term failure test under internal hydrostatic pressure according to DIN 8075 are satisfied.

Figure 3:
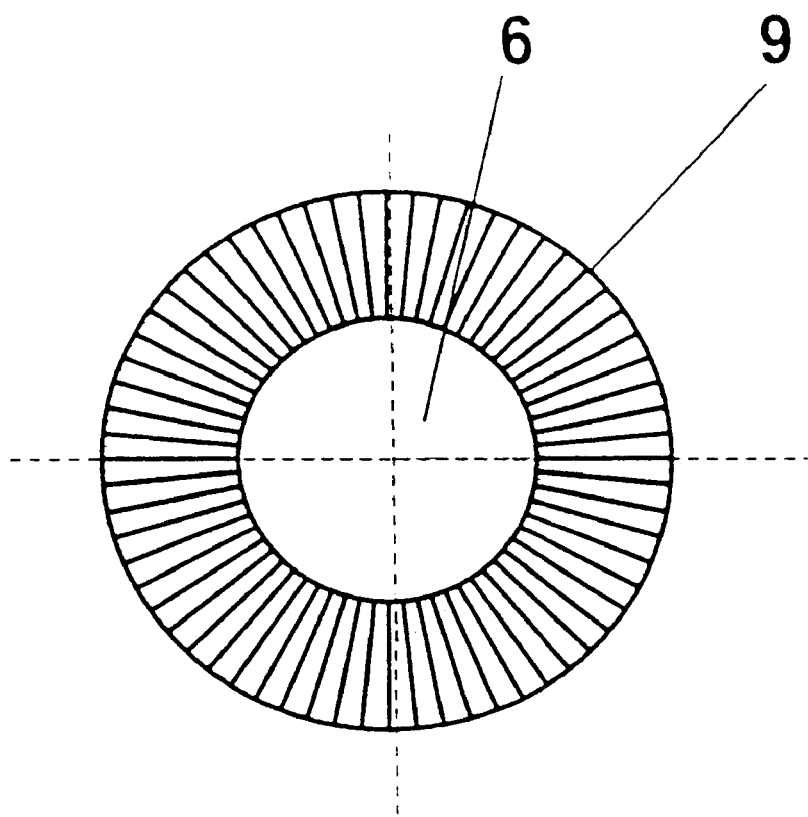
FIG. 3 shows the geometry of the radially serrated end face of the heating element.

According to FIG. 3, the plate-shaped heating element 6 has on its end faces a radially serrated profiling 9, the teeth representing in cross section an equilateral triangle with a flank angle of 60° and the height of the teeth in the pipe diameter range of 110 mm being 4 mm.

We claim:

1. A method of butt-welding crosslinked polyethylene pipes (PE-X pipes) at connecting surfaces, the method which comprises:

providing a profiled heating-element welding tool having a heating element with a radially serrated working face for enlarging the connecting surfaces of the polyethylene pipes;

spatially melting end faces of the polyethelene pipes with the working face of the heating element at a temperature of above 420° C. and below 450° C. to thereby form enlarged and serrated pipe end faces with integral melt layers containing a variety of melting state phases including a vapor or gas phase and a thermoelastic phase;

joining the end faces to one another under a welding pressure of 0.10 to 0.40 N/mm$^2$ and meshing the serrated pipe end faces into one another, such that a melt phase of the melt layers that is capable of entering into a connection evokes a mixing effect of the melt by turbulent movements at mutually contacting flanks of the serrated pipe end faces, and such that a spatially distributed weld seam is produced with an enlarged binding surface, and maintaining the welding pressure until the joining zone has cooled to ambient temperature.

2. The method according to claim 1, which comprises providing the heating element with tooth profiles extending from a periphery towards a center point of a respective heating element end face in a converging manner, and wherein the tooth profiles have a cross section substantially corresponds to an equilateral triangle with a flank angle of 60°.

3. The method according to claim 1, wherein the serrated end faces are formed with teeth having tips and troughs, and the meshing step comprises joining the pipe end faces such that the tips of the teeth of one pipe end face project into a through of the teeth of an opposing pipe end face.

* * * * *

UNITED STATES PATENT AND TRADEMARK OFFICE
CERTIFICATE OF CORRECTION

PATENT NO. : 6,524,425 B1
DATED : February 25, 2003
INVENTOR(S) : Wolfgang Tobias et al.

It is certified that error appears in the above-identified patent and that said Letters Patent is hereby corrected as shown below:

<u>Title page,</u>
Item [73], should read -- [73] Assignee: Kunststoff-Zentrum in Leipzig GGmbH, Leipzig (DE) --

Signed and Sealed this

Twelfth Day of August, 2003

JAMES E. ROGAN
*Director of the United States Patent and Trademark Office*